United States Patent Office 3,355,518
Patented Nov. 28, 1967

3,355,518
COPOLYMERS
Edward M. Sullivan and Nathan L. Zutty, Charleston, W. Va., assignors to Union Carbide Corporation, a corporation of New York
No Drawing. Filed Nov. 25, 1964, Ser. No. 414,008
8 Claims. (Cl. 260—895)

ABSTRACT OF THE DISCLOSURE

Copolymers of ethylene with a fumaramide or oxazolidinone are produced. The copolymers are blended with polyolefins to produce compositions having improved dyeability.

---

The instant invention relates to novel ethylene copolymers and to compositions containing said copolymers.

The novel copolymers of the instant invention are the copolymers of ethylene with a fumaramide of the formula

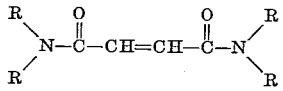

or an oxazolidinone of the formula

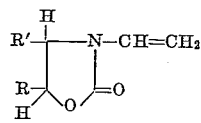

wherein R' is hydrogen or alkyl of from 1 to about 6 carbon atoms and R is alkyl of from 1 to about 6 carbon atoms. Illustrative compounds are N,N,N',N'-tetramethyl fumaramide, N,N,N',N'-tetraethyl fumaramide, N,N,N',N'-tetrapropyl fumaramide, N,N,N',N'-tetraisopropyl fumaramide, N,N,N',N'-tetrabutyl fumaramide, N,N,N',N'-tetrahexyl fumaramide, etc.; 5 - methyl - 3 - vinyl - 2-oxazolidinone, 4,5-dimethyl-3-vinyl-2-oxazolidinone, 5-ethyl-3-vinyl-2-oxazolidinone, 5-isopropyl-3-vinyl-2-oxazolidinone, 4 - methyl-5-butyl-3-vinyl-2-oxazolidinone, 5-hexyl-3-vinyl-2-oxazolidinone, etc.; and the like.

The copolymers can be produced by a batch process or by a continuous process; both of said processes are known in the art and the necessary equipment is readily available. The concentration of the fumaramide or the oxazolidinone comonomer can vary from about 0.1 to about 50 weight percent or more of the copolymer.

In producing the copolymers a mixture of the monomers is polymerized at a pressure above about 500 atmospheres and a temperature above about 40° C. in the presence of a free radical initiator. Generally the polymerization is carried out at pressures of from about 500 to about 10,000 atmospheres, preferably from about 750 to 3,000 atmospheres. The temperature can be varied from about 40° C. to about 350° C., and is preferably from about 125° C. to about 250° C., and most preferably from about 150° C. to about 225° C.

The polymerization is carried out in the presence of a catalytic amount of a free radical initiator, said amount being sufficient to catalyze the polymerization reaction. The free radical initiators that can be employed are well known to the ordinary chemist skilled in the art, and the term "free radical initiator" has an established and recognized means to the skilled chemist. The catalytic amount can be varied from about 1 p.p.m. to about 10,000 p.p.m. or more, preferably from about 1 p.p.m. to about 1,000 p.p.m., and most preferably from about 2 p.p.m. to about 200 p.p.m., based on the total amount of polymerizable monomers charged. Among the free radical initiators suitable for use are those which produce free radicals under the reaction conditions, such as molecular oxygen, peroxides, azo compounds, and so forth. The initiators can be used singly or in combination. Illustrative are the azo type initiators disclosed in United States Patent 2,471,959; the peroxides, such as hydrogen peroxide, lauroyl peroxide, dipropionyl peroxide, butyryl peroxide, benzoyl peroxide, acetyl peroxide, peracetic acid, ditertiary-butyl peroxide, tertiary-butyl hydroperoxide, hydroxyheptyl peroxide, acetyl benzoyl peroxide, diethyl peroxide, succinoyl peroxide, urea peroxide, tetralin peroxide, etc.; the alkali metal persulfates, perborates, and percarbonates; and the ammonium persulfates, perborates, and percarbonates; diisopropyl peroxydicarbonate, and the like.

The ethylene used can vary widely in purity, with commercially available ethylene, which generally varies in purity from 90 to about 99.5 percent or more ethylene, being entirely suitable. The other gases normally found in small amounts in commercial ethylene are acetylene, butylene, ethane, propane, and the like. In most instances the impurities are present at a total concentration of less than about five percent by weight.

The copolymers of the instant invention are normally solids at room temperature. They are useful for the production of films and fibers, and are also used to make molded and extruded shaped articles. The process by which ethylene copolymers are fabricated to films, fibers, shaped articles, etc., are known in the art.

It has now been found that the copolymers of the instant invention, hereinafter called modifying copolymers, can be blended with polyolefins to produce homogeneous compositions that can be used to produce fibers that are readily dyed by conventional procedures and films of improved printability and improved adhesion properties in comparison to the polyolefin per se.

The polyolefins useful as starting materials to produce the blends of this invention are well known. They include the homopolymers and copolymers of the alpha-olefins containing from 2 to about 12 carbon atoms. Illustrative thereof one can mention polyethylene, polypropylene, polybutene-1, polyhexene-1, poly(4-methylpentene-1), poly(3 - methylpentene - 1), poly(5,5-dimethylhexene-1); the copolymers of ethylene and propylene, of ethylene and 4-methylpentene-1, of propylene and hexene-1, of propylene and 4-methylpentene-1, of 3-methylbutene-1 and 5-methylhexene-1, of allylcyclohexane and styrene, of 3-methylpentene-1 and 4-methylpentene-1, and the like; as well as terpolymers and tetrapolymers of monoalpha-olefins. These and many others are known to the art and many are commercially available products.

The blends of polyolefin and modifying copolymer contain from about 1 percent to about 75 percent by weight of the modifying copolymer, the balance being polyolefin. Preferably the concentration of the modifying copolymer in the blend is from about 2.5 percent to about 40 percent by weight, with the most preferred concentration being from about 5 percent to about 20 percent by weight. These compositions are essentially homogeneous blends, and they can be prepared by any of the conventional mixing procedures. During the mixing one can also include antioxidant, heat stabilizer, delusterant, and any other additive desired.

Fibers can be spun from the blends of this invention by conventional spinning techniques; for example, the blended compositions can be melt spun or solution spun and the filaments can then be stretched to orient the molecules and develop the desired tensile properties in the fibers. The preferred blends for fiber application are those containing from 2.5 percent to 40 percent by weight, preferably 5 percent to 20 percent by weight of the modifying copolymer in the blend. The fibers produced from the blends of this invention can be employed in the many applications in which synthetic fibers are used, and they are more readily dyed by conventional dyeing techniques to shades which are much deeper than have heretofore generally been obtainable on polyolefin fibers. Among the dyes that can be used are the well known acids dyes, disperse dyes, soluble vat dyes, azoic dyes, premetallized dyes, and the like. In a typical dyeing procedure with the acid dyes and premetallized dyes, a 40 to 1 dye bath ratio can be used, the bath containing 1 percent by weight of a methyl polyethanol quaternary amine, 4 percent sulfuric acid or formic acid, and 2 percent of the dye, all based on the weight of the fiber. The dyeing is carried out for ninety minutes at the boil and the fiber is then rinsed, scoured, and dried. When a disperse dye is used, a typical dye bath contains 1 percent sodium N-methyl-N-oleoyl laurate, 2 percent of the disperse dye and the dye bath ratio is about 40 to 1.

The amount of dye on the fiber, or the depth of color, is approximately proportional to the K/S value, which is a measure of the light reflected from the dyed sample. The larger the K/S value, the deeper the shade, and a K/S value of 20 indicates that the shade is approximately twice as deep as the shade represented by a K/S value of 10. The determination of the K/S values is set forth in an article by D. B. Judd, "Color in Business," Science and Industry, 1952, pages 314 to 342. Among the dyes that can be used to dye the fibers of this invention are the following:

Acid:
    Yellow 1—C.I. 10316
    Yellow 3—C.I. 47005
    Yellow 7—C.I. 56205
    Yellow 11—C.I. 18820
    Yellow 23—C.I. 19140
    Yellow 29—C.I. 18900
    Yellow 36—C.I. 13065
    Yellow 42—C.I. 22910
    Yellow 54—C.I. 19010
    Yellow 99—C.I. 13900

Orange 1—C.I. 13090/1
    Orange 7—C.I. 15510
    Orange 10—C.I. 16230
    Orange 24—C.I. 20170
    Orange 49—C.I. 23260
    Orange 72—C.I. 18740
    Orange 74—C.I. 18745

Red 1—C.I. 18050
    Red 12—C.I. 14835
    Red 14—C.I. 14720
    Red 26—C.I. 16150
    Red 34—C.I. 17030
    Red 37—C.I. 17045
    Red 73—C.I. 27290
    Red 85—C.I. 22245
    Red 89—C.I. 23910
    Red 115—C.I. 27200
    Red 116—C.I. 26660
    Red 134—C.I. 24810
    Red 179—C.I. 19351

Violet 1—C.I. 17025
    Violet 7—C.I. 18055
    Violet 17—C.I. 42650
    Violet 43—C.I. 60730

Blue 1—C.I. 42045
    Blue 9—C.I. 42090
    Blue 22—C.I. 42755
    Blue 25—C.I. 62055
    Blue 59—C.I. 50315
    Blue 83—C.I. 42660
    Blue 102—C.I. 50320

Acid:
    Green 1—C.I. 10020
    Green 3—C.I. 42085
    Green 16—C.I. 44025
    Green 20—C.I. 20495
    Green 50—C.I. 44090

Brown 14—C.I. 20195
    Brown 42—C.I. 14251

Black 1—C.I. 20470
    Black 24—C.I. 26370
    Black 48—C.I. 65005
    Black 52—C.I. 15711

Disperse:
    Yellow 1—C.I. 10345
    Yellow 3—C.I. 11855
    Yellow 31—C.I. 48000

Orange 1—C.I. 11080
    Orange 3—C.I. 11005
    Orange 7—C.I. 11240

Red 1—C.I. 11110
    Red 4—C.I. 60755
    Red 11—C.I. 62015
    Red 13—C.I. 11115
    Red 15—C.I. 60710
    Red 17—C.I. 11210

Disperse:
    Violet 1—C.I. 61100
    Violet 4—C.I. 61105
    Violet 8—C.I. 62030
    Violet 13—C.I. 11195

Blue 1—C.I. 64500
    Blue 3—C.I. 61505
    Blue 7—C.I. 62500

Black 1—C.I. 11365
    Black 7—C.I. 11035

Azoic Diazo Components:
    Diazo 1—C.I. 37135
    Diazo 2—C.I. 37005
    Diazo 3—C.I. 37010
    Diazo 4—C.I. 37210
    Diazo 5—C.I. 37125
    Diazo 6—C.I. 37025
    Diazo 8—C.I. 37110
    Diazo 10—C.I. 37120
    Diazo 13—C.I. 37130
    Diazo 20—C.I. 37175
    Diazo 28—C.I. 37151
    Diazo 32—C.I. 37090
    Diazo 34—C.I. 37100
    Diazo 35—C.I. 37255
    Diazo 38—C.I. 37190
    Diazo 41—C.I. 37165
    Diazo 44—C.I. 37000
    Diazo 48—C.I. 37235

Azoic Coupling Components:
    Coupling 2—C.I. 37505
    Coupling 3—C.I. 37575
    Coupling 5—C.I. 37610
    Coupling 7—C.I. 37565
    Coupling 10—C.I. 37510
    Coupling 12—C.I. 37550
    Coupling 13—C.I. 37595
    Coupling 14—C.I. 37558
    Coupling 17—C.I. 37515
    Coupling 20—C.I. 37530
    Coupling 29—C.I. 37527
    Coupling 34—C.I. 37531
    Coupling 36—C.I. 37585

Soluble Vat:
    Yellow 2—C.I. 67301
    Yellow 4—C.I. 59101
    Yellow 5—C.I. 56006

Soluble Vat:
  Orange 1—C.I. 59106
  Orange 2—C.I. 59706
  Orange 5—C.I. 73336

Red 1—C.I. 73361
  Red 10—C.I. 67001

Violet 1—C.I. 60011
  Violet 2—C.I. 73386
  Violet 3—C.I. 73396

Blue 1—C.I. 73002
  Blue 5—C.I. 73066
  Blue 6—C.I. 69826
  Blue 7—C.I. 70306

Green 1—C.I. 59826
  Green 2—C.I. 59831
  Green 3—C.I. 69501

Brown 1—C.I. 70801
  Brown 3—C.I. 69016
  Brown 5—C.I. 73411

Black 1—C.I. 73671 and the like. The Colour Index numbers are those listed in the latest Colour Index.

In the following examples the melt index was determined by ASTM D-1238-57T, the temperature of measurement being 190° C. for the modifying copolymers and 230° C. for the polypropylene; density by ASTM D-1505-57T; and tensile, elongation and stiffness by ASTM D-1380-55T. Parts are by weight unless otherwise indicated.

EXAMPLE 1

A stainless steel rocking autoclave having a volume of 350 cc. was charged with 94 grams of distilled and deoxygenated water, 60 grams of tertiary butanol, 23 grams of 5-methyl-3-vinyl-2-oxazolidinone and 0.2 gram of azobis-isobutyronitrile catalyst. The reaction vessel was purged three times with ethylene and pressured to 1,000 p.s.i. with oxygen-free ethylene while agitating. After heat was applied to bring the temperature of the reaction mix of 0.9662, a room temperature stiffness of 18,750 p.s.i., by the addition of ethylene. During the reaction time of one hour and 11 minutes the temperature ranged from 89°–120° C. and the pressure was maintained at from about 14,000 p.s.i. to 15,000 p.s.i. by periodic injection of ethylene. After the reaction was complete the autoclave contained 45 grams of ethylene/5-methyl-3-vinyl-2-oxazolidinone copolymer which had a content of 28.6 percent 5-methyl-3-vinyl-2-oxazolidinone as determined by nitrogen analysis. A plaque prepared from the copolymer had exceptional clarity, a melt index of 6.32, a density of 0.9662, a room temperature stiffness of 18,750 p.s.i., a tensile strength of 2,975 p.s.i., and an elongation of 475 percent.

In a similar manner solid copolymers of ethylene with the following oxazolidinone compounds are produced, 5-ethyl-3-vinyl-2-oxazolidinone, 4-methyl-5-butyl-3-vinyl-2-oxazolidinone, and 5-hexyl-3-vinyl-2-oxazolidinone.

EXAMPLE 2

Under conditions similar to those described in Example 1 the same charge was made to the autoclave. After a reaction period of 47 minutes at a pressure of from about 14,000 p.s.i. to 15,000 p.s.i. and a temperature of 87°–93° C. the autoclave contained 47 grams of ethylene/5-methyl-2-vinyl-2-oxazolidinone copolymer which by nitrogen analysis was shown to contain 34.5 percent 5-methyl-3-vinyl-2-oxazolidinone. The copolymer had a melt index of 6.92, a room temperature stiffness of 13,500 p.s.i., a tensile strength of 3,112, an elongation of 480 percent, and a density of 0.9672.

The copolymer is also produced in a continuous manner using a tubular reaction process.

EXAMPLE 3

A stainless steel lined autoclave having a volume of 1,490 cc. was charged with 750 grams of benzene, 13.6 grams of N,N,N',N'-tetraethyl fumaramide, and 4.0 ml. of 1% di-t-butyl peroxide in benzene. The reaction vessel was purged three times with ethylene and pressured to 1,500 p.s.i. with oxygen free ethylene while agitating. After heat was applied to bring the temperature of the reaction mixture to 157° C. the pressure was elevated to 15,000 p.s.i. by the further addition of ethylene. During the reaction period of three hours and 20 minutes the temperature ranged from 157°–160° C. and the pressure was maintained at from about 14,000 p.s.i. to 15,000 p.s.i. by periodic injection of ethylene. After the reaction was complete the autoclave contained 85 grams of ethylene/N,N,N',N'-tetraethyl fumaramide copolymer which had a content of 17.8 percent N,N,N',N'-tetraethyl fumaramide as determined by nitrogen analysis. A plaque prepared from the copolymer was exceptionally clear, had a melt index of 2.48, a density of 0.9260, a room temperature stiffness of 6,000 p.s.i., a tensile strength of 3,245 p.s.i., and an elongation of 650 percent.

EXAMPLE 4

Under conditions similar to those described in Example 3, 750 grams of benzene, 22.1 grams of N,N,N',N'-tetraethyl fumaramide and 5.0 ml. of 1% di-ti-butyl peroxide in benzene were charged to the autoclave. After a reaction period of two hours and 45 minutes at a pressure of from about 14,000 p.s.i. to 15,000 p.s.i. and a temperature of 160°–161° C. the autoclave contained 61 grams ethylene/N,N,N',N'-tetraethyl fumaramide copolymer which by nitrogen analysis contained 23.1 percent N,N,N',N'-tetraethyl fumaramide. The copolymer had a melt index of 9.16, a density of 0.9340, a room temperature stiffness of 3,750 p.s.i., a tensile strength of 3,062 p.s.i. and an elongation of 667 percent.

The solid copolymers of ethylene with the indicated fumaramides are produced in a similar manner, namely, N,N,N',N' - tetramethyl fumaramide, N,N,N'N' - tetra - t-butyl fumaramide, and N,N,N',N'-tetrahexyl fumaramide.

EXAMPLE 5

Ten parts of the copolymer of Example 1 and 90 parts of polypropylene having a melt index of 5 dgm./min. and a density of 0.91 g./ml. were blended on an electrically heated two-roll mill at 170° C. The blend also contained 0.5 weight percent diphenylpentaerythritol diphosphite and 0.5 weight percent of a benzothiazole as ultraviolet absorber. The homogeneous blend was extruded through a 0.030-inch spinnerette at an orifice velocity of 3.1 feet per minute. The fibers were melt drawn at a 150:1 ratio and wound at a speed of 465 feet per minute. The spun yarn was subsequently oriented by stretching 300 percent in an atmosphere of steam. The stretched fibers had the following properties:

Denier _____ 130
Tenacity, g.p.d. _____ 4.5
Elongation, percent _____ 26
Stiffness Modulus, g.p.d. _____ 48
Shrinkage, percent 100° C. water _____ 5.4
125° C. air _____ 9.2

Knited fabrics were produced and dyed with 2 percent Celliton Fast Red GGA (Disperse Red 17, C.I. No 11210) and with 2 percent Cibalan Blue BL neutral premetallized dye (Acid Blue 168). The K/S values were as follows:

K/S
Disperse Red 17 _____ 19.0
Acid Blue 168 _____ 1.29

A knitted fabric prepared from fibers produced from the same unmodified polypropylene used to produce the blend showed negligible dyeability; appearing only as a slight stain on the fabric and giving K/S values of less than 0.3.

Similarly fibers are produced from blends of solid polyethylene having a density of about 0.95 g./ml. and the copolymer of Example 1; and from blends of solid poly(4-methylpentene-1) and said copolymer.

EXAMPLE 6

A homogeneous blend was prepared using 12.5 parts of the copolymer of Example 2 and 87.5 parts of the same polypropylene used in Example 5; the stabilizers were also present. Fibers were spun as described in Example 5 and oriented by stretching 319 percent. Properties of the yarn were:

Denier _____ 141
Tenacity, g.p.d. _____ 4.14
Elongation, percent _____ 30
Stiffness Modulus, g.p.d. _____ 47
Shrinkage, percent, 100° C. water _____ 6.1
125° C. air _____ 8.3

Knitted fabrics were prepared and dyed with 2 percent Cibalan Blue BL, a neutral premetallized dye (Acid Blue 168), and 2 percent Eastman Polyester Red B, a disperse dye. The following K/S values were measured on the dyed samples:

K/S
Acid Blue 168 _____ 3.56
Eastman Polyester Red B _____ 9.89

Blends and fibers are also produced from a mixture of said polypropylene with a copolymer of ethylene and 5-ethyl-3-vinyl-2-oxazolidinone, or with a copolymer of ethylene and 5-hexyl-3-vinyl-2-oxazolidinone.

EXAMPLE 7

Homogeneous blends were prepared as in Example 5 using 8 parts of the copolymer of Example 3 and 92 parts of polypropylene (Blend I) and 12 parts of the copolymer of Example 3 and 88 parts of polypropylene (Blend II); the stabilizers were also present. Yarns were produced as in Example 5 and oriented by stretching 298 and 295 percent, respectively. The resultant yarns had the following properties:

|  | Blend I | Blend II |
| --- | --- | --- |
| Denier | 153 | 153 |
| Tenacity, g.p.d | 4.0 | 3.9 |
| Elongation, percent | 35 | 29 |
| Stiffness Modulus, g.p.d | 41 | 39 |
| Shrinkage, percent: | | |
| 100° C. water | 5.3 | 6.6 |
| 125° C. air | 7.8 | 10.3 |

Knitted fabrics were produced and dyed with 2 percent Celliton Fast Red GGA (Disperse Red 17, C.I. No. 11210) and 2 percent Cibalan Blue BL (Acid Blue 168), and the following K/S values were measured on the dyed fabrics:

|  | K/S | |
| --- | --- | --- |
|  | Blend I | Blend II |
| Disperse Red 17 | 9.89 | 12.18 |
| Acid Blue 168 | 1.60 | 1.60 |

Fibers are also produced from blends of polyethylene with the copolymer of ethylene and N,N,N',N'-tetraisopropyl fumaramide, or the copolymer of ethylene and propylene with the copolymer of ethylene and N,N,N',N'-tetramethyl fumaramide.

EXAMPLE 8

A homogeneous blend was produced as described in Example 5 using 10 parts of the copolymer of Example 4 and 90 parts of polypropylene; the stabilizers were also present. Yarns were produced as described in Example 5 and oriented by stretching 317 percent. The yarn properties were as follows:

Denier _____ 136
Tenacity, g.p.d. _____ 4.3
Elongation, percent _____ 20.1
Stiffness Modulus, g.p.d. _____ 46
Shrinkage, percent, in 100° C. water ____ 6.6
125° C. air _____ 9.2

Knitted fabrics were produced and dyed with 2 percent Celliton Fast Red GGA (Disperse Red 17, C.I. No. 11210) and Cibalan Blue BL, a neutral premetallized dye (Acid Blue 168) with the following results:

K/S
Disperse Red 17 _____ 16.9
Acid Blue 168 _____ 6.2

The blends of polyethylene or polypropylene with the copolymer of ethylene and N,N,N',N'-tetrabutyl fumaramide or the copolymer of ethylene and N,N,N',N'-tetrapropyl fumaramide also produce readily dyeable fibers and selfsupporting films.

The deep dyeing observed on all of the yarns produced from the blends of this invention are in vivid contrast to the almost negligible staining observed on the unmodified polyolefin yarns.

What is claimed is:

1. A composition comprising a blend of (A) from about 25 to 99 percent by weight of a polyolefin and (B) from about 1 to 75 percent by weight of a normally solid copolymer of ethylene and a comonomer selected from the group consisting of the fumaramides of the formula:

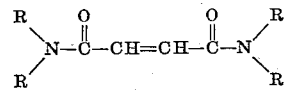

and the oxazolidinones of the formula:

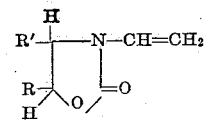

wherein R' is selected from the group consisting of hydrogen and alkyl of 1 to 6 carbon atoms and R is alkyl of from 1 to 6 carbon atoms.

2. A composition comprising a blend of (A) from about 60 to 97.5 percent by weight of a polyolefin and (B) from about 2.5 to 40 percent by weight of a normally solid copolymer of ethylene and a comonomer selected from the group consisting of the fumaramides of the formula:

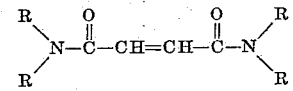

and the oxazolidinones of the formula:

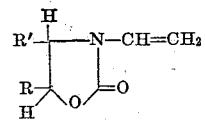

wherein R' is selected from the group consisting of hydrogen and alkyl of 1 to 6 carbon atoms and R is alkyl of from 1 to 6 carbon atoms.

3. A composition comprising a blend of (A) from about 80 to 95 percent by weight of a polyolefin and (B) from about 5 to 20 percent by weight of a normally solid copolymer of ethylene and a comonomer selected from the and the oxazolidinones of the formula:

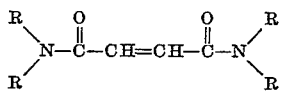

and the oxazolidinones of the formula:

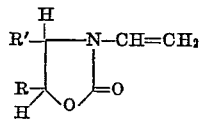

wherein R' is selected from the group consisting of hydrogen and alkyl of 1 to 6 carbon atoms and R is alkyl of from 1 to 6 carbon atoms.

4. The composition of claim 1, wherein component (A) is polypropylene and component (B) is 5-methyl-3-vinyl-2-oxazolidinone.

5. The composition of claim 1, wherein component (A) is polypropylene and component (B) is N,N,N',N'-tetraethyl fumaramide.

6. The composition of claim 1 in the form of a filament.

7. The composition of claim 4 in the form of a filament.

8. The composition of claim 5 in the form of a filament.

References Cited

UNITED STATES PATENTS

| | | | |
|---|---|---|---|
| 2,698,316 | 12/1954 | Giammaria. | |
| 2,818,362 | 12/1957 | Dreshsel | 260—868 |
| 3,256,364 | 6/1966 | Bryant et al. | 260—895 |

SAMUEL H. BLECH, *Primary Examiner.*

D. J. BREZNER, *Assistant Examiner.*

UNITED STATES PATENT OFFICE
CERTIFICATE OF CORRECTION

Patent No. 3,355,518                                       November 28, 1967

Edward M. Sullivan et al.

It is hereby certified that error appears in the above numbered patent requiring correction and that the said Letters Patent should read as corrected below.

Column 5, line 43, strike out "of 0.9662, a room temperature stiffness of 18,750 p.s.i.," and insert instead -- ture to 90° C., the pressure was elevated to 15,000 p.s.i. --.

Signed and sealed this 17th day of December 1968.

(SEAL)
Attest:

Edward M. Fletcher, Jr.                                EDWARD J. BRENNER
Attesting Officer                                           Commissioner of Patents